United States Patent
Lin

(10) Patent No.: US 8,944,699 B2
(45) Date of Patent: Feb. 3, 2015

(54) OPTICAL FIBER CONNECTOR AND OPTICAL FIBER ASSEMBLING METHOD

(71) Applicant: Hon Hai Precision Industry Co., Ltd., New Taipei (TW)

(72) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 117 days.

(21) Appl. No.: 13/736,084

(22) Filed: Jan. 8, 2013

(65) Prior Publication Data
US 2014/0133805 A1     May 15, 2014

(51) Int. Cl.
*G02B 6/36* (2006.01)
*G02B 6/38* (2006.01)
*G02B 6/25* (2006.01)

(52) U.S. Cl.
CPC .. *G02B 6/38* (2013.01); *G02B 6/25* (2013.01); *G02B 6/3839* (2013.01); *G02B 6/3863* (2013.01)
USPC .................................. 385/65; 385/83; 385/85

(58) Field of Classification Search
None
See application file for complete search history.

(56) References Cited

U.S. PATENT DOCUMENTS

| | | | | |
|---|---|---|---|---|
| 6,062,740 | A * | 5/2000 | Ohtsuka et al. | 385/81 |
| 2001/0007603 | A1* | 7/2001 | Sakurai et al. | 385/60 |
| 2001/0036341 | A1* | 11/2001 | Ohtsuka et al. | 385/78 |
| 2002/0085814 | A1* | 7/2002 | Otsu et al. | 385/59 |
| 2002/0146213 | A1* | 10/2002 | Shigenaga et al. | 385/78 |
| 2003/0235374 | A1* | 12/2003 | Luther et al. | 385/85 |
| 2005/0036742 | A1* | 2/2005 | Dean et al. | 385/71 |
| 2011/0044589 | A1* | 2/2011 | Takaoka et al. | 385/83 |
| 2011/0075975 | A1* | 3/2011 | Wang et al. | 385/78 |

\* cited by examiner

*Primary Examiner* — Mike Stahl
(74) *Attorney, Agent, or Firm* — Novak Druce Connolly Bove + Quigg LLP

(57) ABSTRACT

An exemplary optical fiber connector includes a first surface and a second surface at opposite sides thereof, and a third surface connected between the first surface and the second surface. Two projections are formed on the first surface, and extend a same distance along a direction perpendicular to the first surface. The optical fiber connector defines a fixing recess extending from the second surface towards the first surface and being open at the third surface. The fixing recess has a first inner surface and a second inner surface. The first inner surface is parallel to the third surface. The second inner surface is parallel to the first surface. The first inner surface defines a number of receiving grooves. The optical fiber connector defines a number of receiving holes extending from the second inner surface to the first surface. The receiving holes are aligned and communicated with the receiving grooves, respectively.

6 Claims, 6 Drawing Sheets

OPTICAL FIBER CONNECTOR AND OPTICAL FIBER ASSEMBLING METHOD

BACKGROUND

1. Technical Field

The present disclosure relates to an optical fiber connector and an optical fiber assembling method.

2. Description of Related Art

During manufacture of an optical fiber connector, a number of optical fibers are installed in the optical fiber connector. In this process, distal ends of the optical fibers must be aligned with each other. Yet, in a conventional optical fiber connector, the distal ends of the optical fibers are hidden inside the optical fiber connector. Thus, it is not easy to align the distal ends of the optical fibers.

Therefore, it is desired to provide an optical fiber connector and an assembling method for optical fibers which can overcome the above mentioned problems.

DETAILED DESCRIPTION

Figure 1:
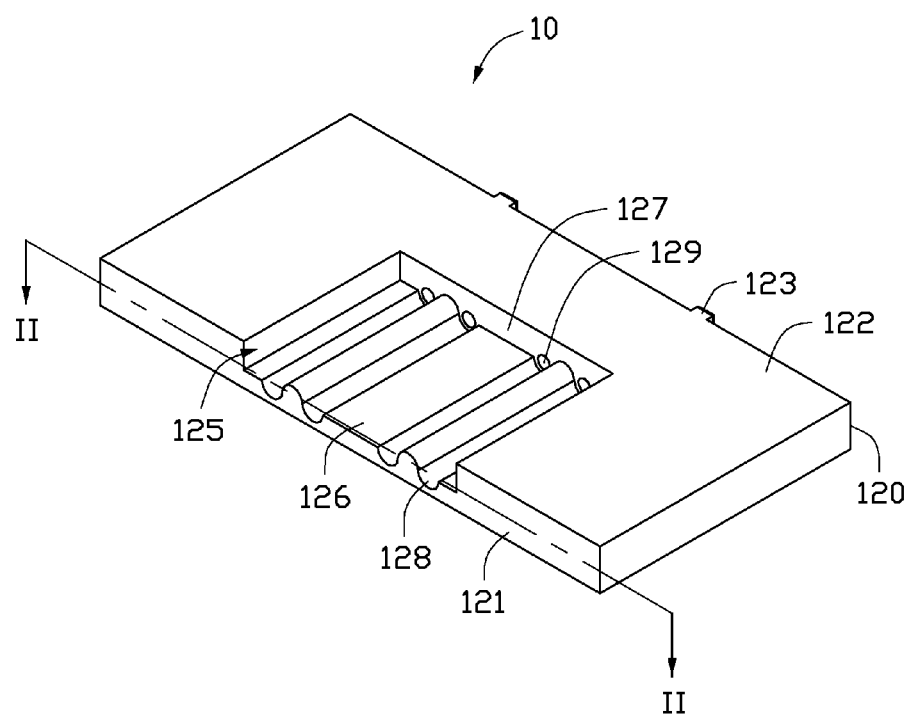
FIG. 1 is a schematic, isometric view of an optical fiber connector according to a first embodiment.
Figure 2:
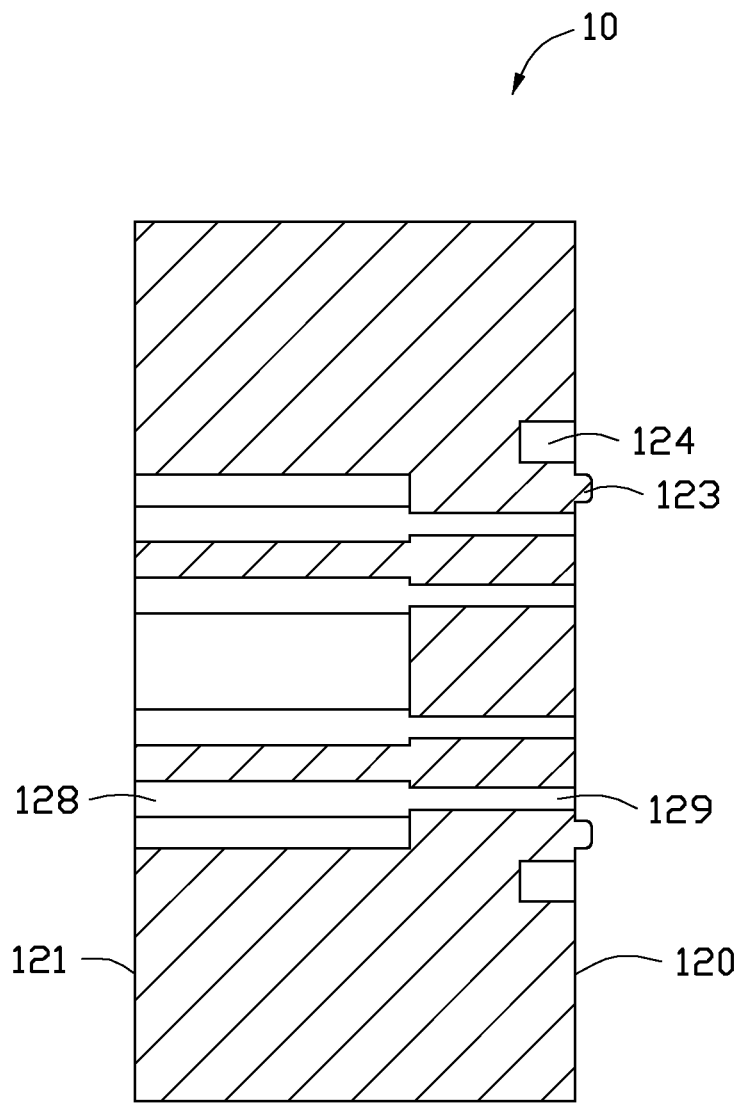
FIG. 2 is a cross-sectional view taken along II-II line of the optical fiber connector of FIG. 1.
Figure 3:
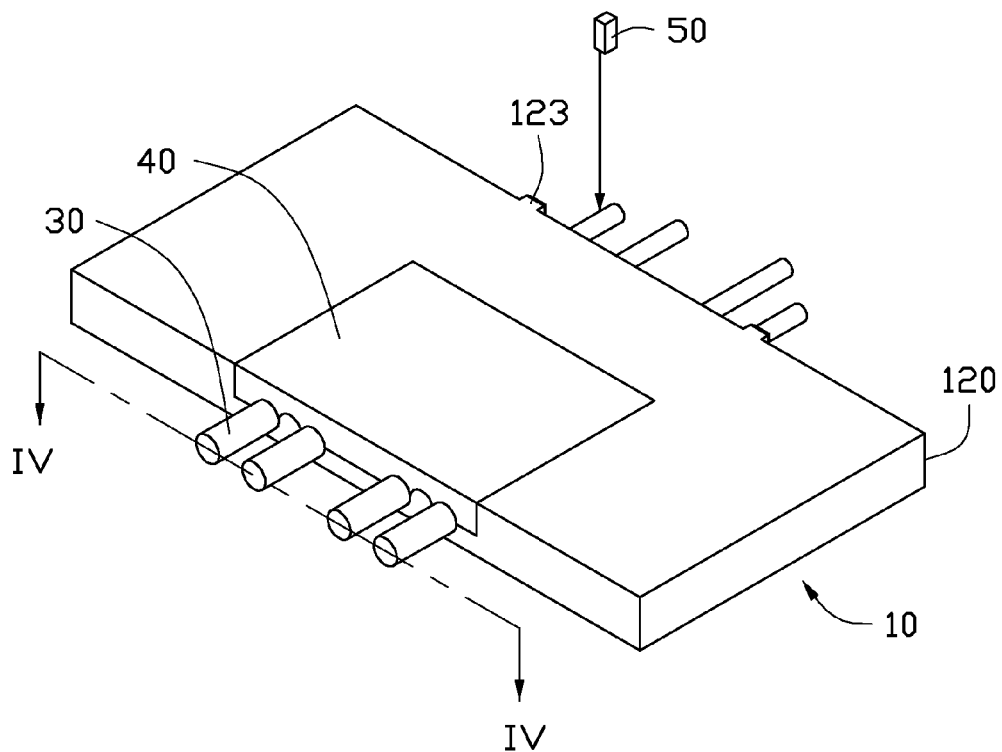
FIG. 3 is a schematic, isometric view of the optical fiber connector of FIG. 1 with optical fibers received therein.
Figure 4:
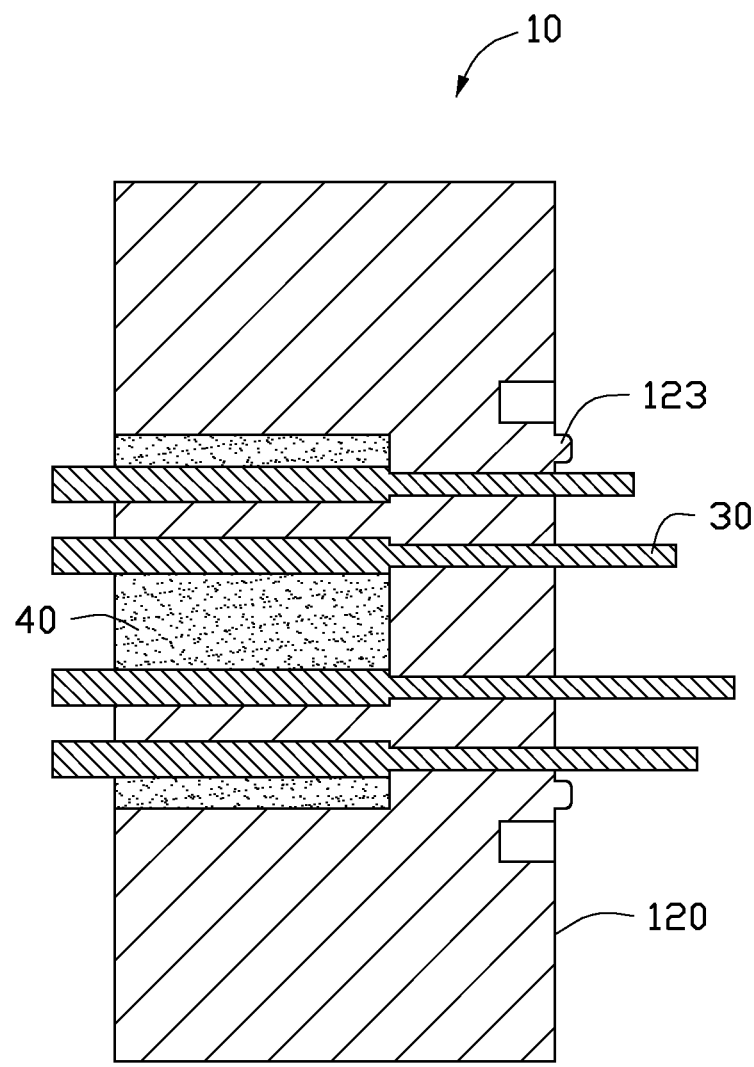
FIG. 4 is a cross-sectional view taken along IV-IV line of the optical fiber connector of FIG. 3.
Figure 5:
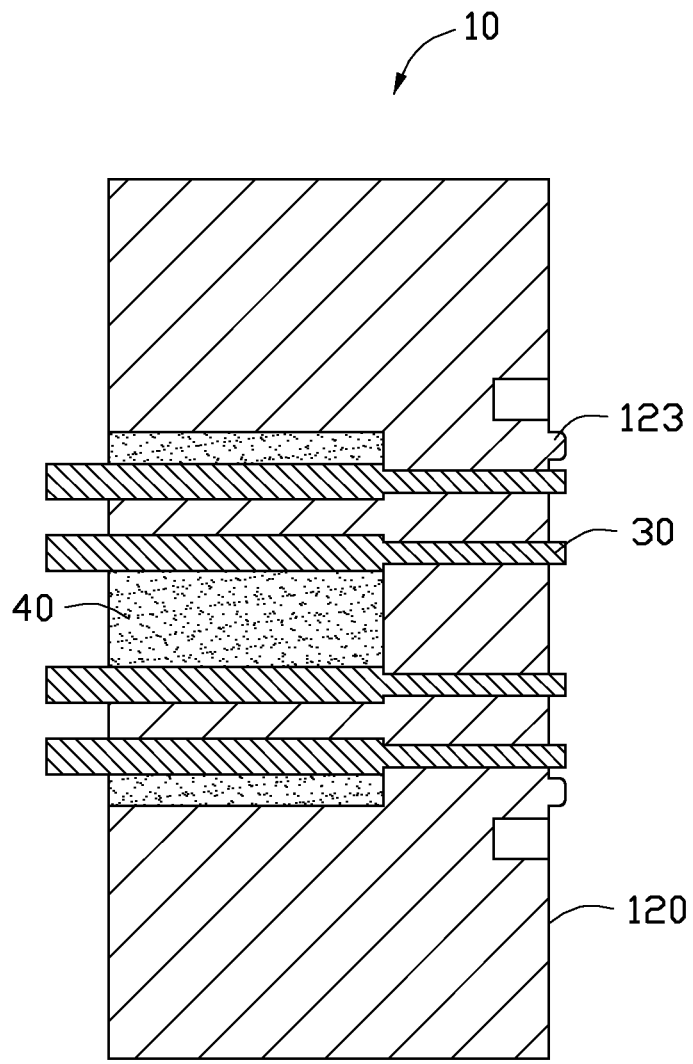
FIG. 5 is similar to FIG. 4, but showing distal ends of the optical fibers aligned with each other after cutting.
Figure 6:
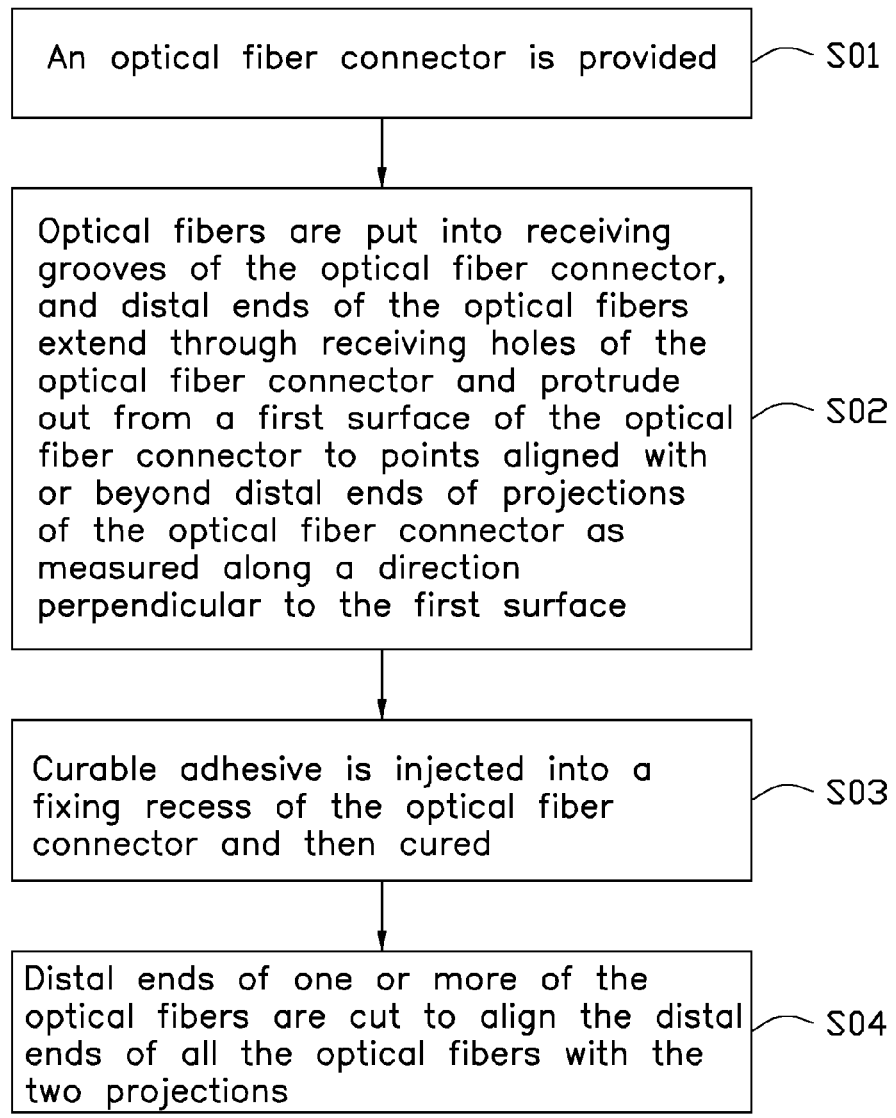
FIG. 6 is a flowchart of an optical fiber assembling method according to a second embodiment.

FIGS. 1 and 2 show an optical fiber connector 10 according to a first embodiment. The optical fiber connector 10 is configured for receiving a number of optical fibers 30 (see FIG. 3). In this embodiment, there are four optical fibers 30.

The optical fiber connector 10 is substantially a transparent rectangular parallelepiped. The optical fiber connector 10 includes a first surface 120, a second surface 121 opposite to the first surface 120, and a third surface 122 connecting the first surface 120 to the second surface 121. Two projections 123 are formed on the first surface 120, and extend in a direction perpendicular to the first surface 120 a same distance. The first surface 120 defines two holes 124 at two opposite sides thereof, respectively. The holes 124 are configured to provide connection of the optical fiber connector 10 to a photoelectric transmitting module (not shown).

The optical fiber connector 10 defines a fixing recess 125 extending from the second surface 121 towards the first surface 120. The fixing recess 125 is substantially a rectangular parallelepiped in shape, and is open at the third surface 122. The fixing recess 125 has a first inner surface 126 and a second inner surface 127. The first inner surface 126 is generally parallel to the third surface 122. The second inner surface 127 is parallel to the first surface 120.

The first inner surface 126 defines a plurality of receiving grooves 128. In this embodiment, there are four receiving grooves 128. The extending direction of each of the receiving grooves 128 is perpendicular to the first surface 120. In the embodiment, the receiving grooves 128 are semicircular shaped. In other embodiments, the receiving grooves 128 can be V-shaped. The optical fiber connector 10 further defines a plurality of receiving holes 129. The receiving holes 129 extend from the second inner surface 127 to the first surface 120. The receiving holes 129 are aligned and communicated with the receiving grooves 128, respectively. Thus in this embodiment, there are four receiving holes 129. Ends of all the receiving holes 129 at the first surface 120 are positioned between the two projections 123. The receiving grooves 128 and the receiving holes 129 are configured for receiving the optical fibers 30. In this embodiment, a common diameter of the receiving holes 129 is less than a common diameter of the receiving grooves 128. Correspondingly, a diameter of a portion of each optical fiber 30 located in the respective receiving hole 129 is less than a diameter of another portion of the optical fiber 30 located in the respective receiving groove 128.

Referring to FIGS. 3 to 6, these illustrate aspects of an optical fiber assembling method according to a second embodiment. In step S01, the optical fiber connector 10 is provided. In step S02, the optical fibers 30 are put into the receiving grooves 128. Then distal ends of the optical fibers 30 extend through the receiving holes 129 and protrude out from the first surface 120 to points aligned with or beyond distal ends of the projections 123, as measured along the direction perpendicular to the first surface 120. In step S03, curable adhesive 40 is injected into the fixing recess 125 and then cured. The curable adhesive 40 fixes and keeps the optical fibers 30 in the fixing recess 125. In step S04, a laser device 50 is used to cut distal ends of one or more of the optical fibers 30, to align the distal ends of all the optical fibers 30 with the distal ends of the two projections 123.

In summary, the optical fibers 30 extend beyond the first surface 120 of the optical fiber connector 10. Thus, it is easy to align the distal ends of the optical fibers 30 with each other by using the laser device 10 and the projections 123.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An optical fiber assembling method comprising:
   providing an optical fiber connector, the optical fiber connector comprising:
   a first surface and a second surface at opposite sides thereof, and a third surface connected between the first surface and the second surface;
   a fixing recess extending from the second surface towards the first surface and being open at the third surface, the fixing recess comprising a first inner surface and a second inner surface, the first inner surface being generally parallel to the third surface, the second inner surface being parallel to the first surface, and the first inner surface defining a plurality of receiving grooves;
   a plurality of receiving holes extending from the second inner surface to the first surface, the receiving holes being aligned and communicated with the receiving grooves, respectively; and
   two projections formed on the first surface, and extending a same distance along a direction perpendicular to the first surface;
   putting a plurality of optical fibers into the receiving grooves, distal ends of the optical fibers extending through the receiving holes and protruding out from the first surface to points aligned with or beyond distal ends of the projections as measured along the direction perpendicular to the first surface; and cutting the distal end of one or more of the optical fibers to align the distal ends of all the optical fibers with the two projections.

2. The optical fiber assembling method of claim 1, wherein the optical fibers are cut by a laser device.

3. The optical fiber assembling method of claim 1, further comprising applying a curable adhesive in the fixing recess to fix the optical fibers in position.

4. An optical fiber connector comprising:
a first surface and a second surface at opposite sides thereof, and a third surface connected between the first surface and the second surface;
a fixing recess extending from the second surface towards the first surface, the fixing recess comprising a first inner surface and a second inner surface, the first inner surface being generally parallel to the third surface, the second inner surface being parallel to the first surface, and the first inner surface defining a plurality of receiving grooves;
a same plurality of receiving holes extending from the second inner surface to the first surface, the receiving holes being aligned and communicated with the receiving grooves, respectively;
two projections formed on the first surface, and extending a same distance along a direction perpendicular to the first surface;
a same plurality of optical fibers received in the receiving grooves and the receiving holes, wherein the optical fibers protrude from the first surface a same distance along a direction perpendicular to the first surface, and the same distance that the optical fibers protrude is the same as the same distance that the two projections formed on the first surface extend; and
a curable adhesive applied in the fixing recess and fixing the optical fibers in position.

5. The optical fiber connector of claim 4, wherein an extending direction of each of the receiving grooves is perpendicular to the first surface.

6. The optical fiber connector of claim 4, wherein the receiving grooves are semicircular shaped.

* * * * *